US006710689B2

(12) United States Patent
Wohlfarth

(10) Patent No.: US 6,710,689 B2
(45) Date of Patent: Mar. 23, 2004

(54) FLOATING CONTACTOR RELAY

(75) Inventor: Paul D. Wohlfarth, Vernonia, OR (US)

(73) Assignee: Credence Systems Corporation, Milpitas, CA (US)

( * ) Notice: Subject to any disclaimer, the term of this patent is extended or adjusted under 35 U.S.C. 154(b) by 329 days.

(21) Appl. No.: 09/783,888

(22) Filed: Feb. 14, 2001

(65) Prior Publication Data

US 2002/0109568 A1 Aug. 15, 2002

(51) Int. Cl.7 .............................................. H01M 51/22
(52) U.S. Cl. ......................................... 335/78; 200/181
(58) Field of Search ............................ 335/78–86, 124, 335/128; 200/181; 257/414, 421, 424–7, 532; 336/200

(56) References Cited

U.S. PATENT DOCUMENTS 3,514,728 A * 5/1970 Ugon .......................... 335/78
5,543,767 A 8/1996 Elenbaas
5,777,539 A * 7/1998 Folker et al. ............... 336/200

* cited by examiner

*Primary Examiner*—Lincoln Donovan
(74) *Attorney, Agent, or Firm*—Daniel J. Bedell; Smith-Hill and Bedell

(57) ABSTRACT

A relay includes one or more conductive coils embedded in a substrate having multiple insulating layers. Each coil is formed by conductive traces formed between several substrate layers and vias extending vertically between traces on adjacent layers. Each coil surrounds a separate core extending vertically within the substrate. At least one set of contacts reside on the substrate bordering a space containing a contactor. The contactor is formed of conductive material, has a conductive surface and is “free-floating” in that it is unattached to any other object and free to move within the space bordered by the contacts. Current passing through the coil or coils produces magnetic fields which can move the contactor onto or away from the contacts so as to selectively make or break a signal path between the contacts.

44 Claims, 8 Drawing Sheets

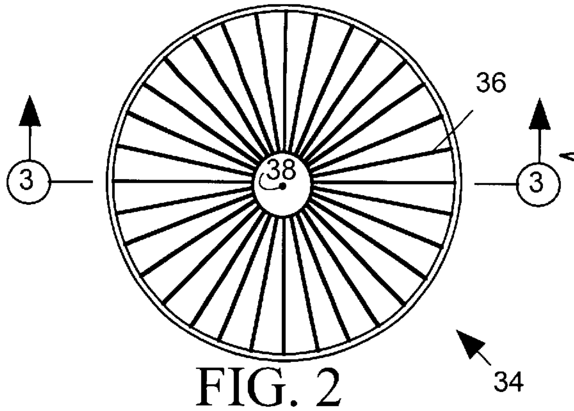
FIG. 2
(PRIOR ART)
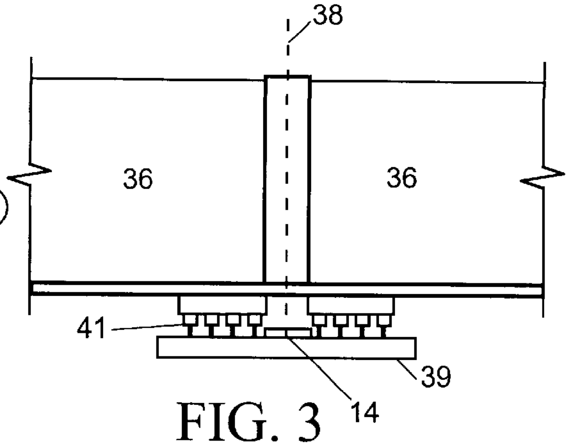
FIG. 3
(PRIOR ART)
FIG. 4
(PRIOR ART)
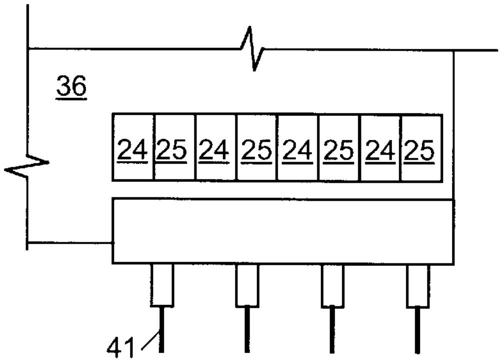
FIG. 5
(PRIOR ART)
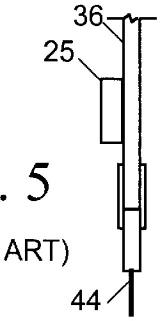
FIG. 6
(PRIOR ART)
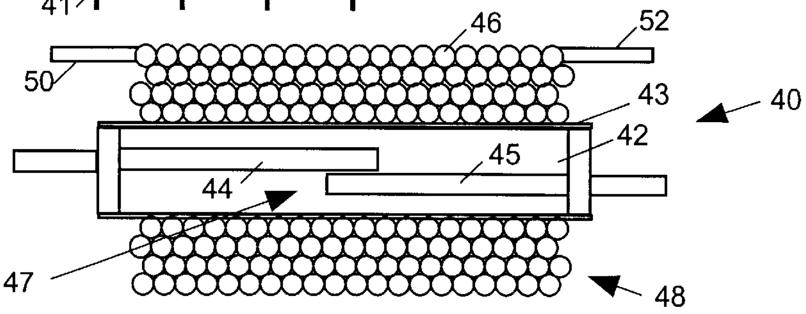
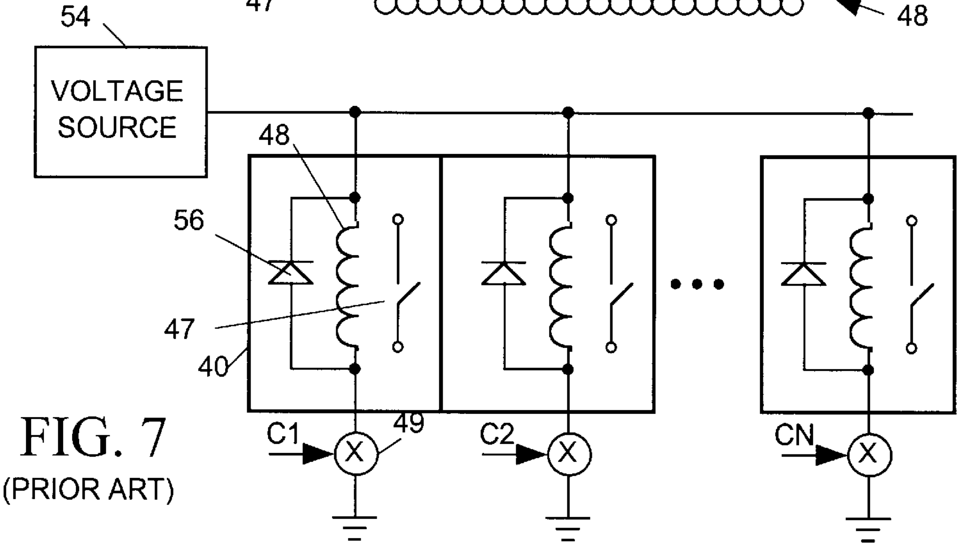
FIG. 7
(PRIOR ART)

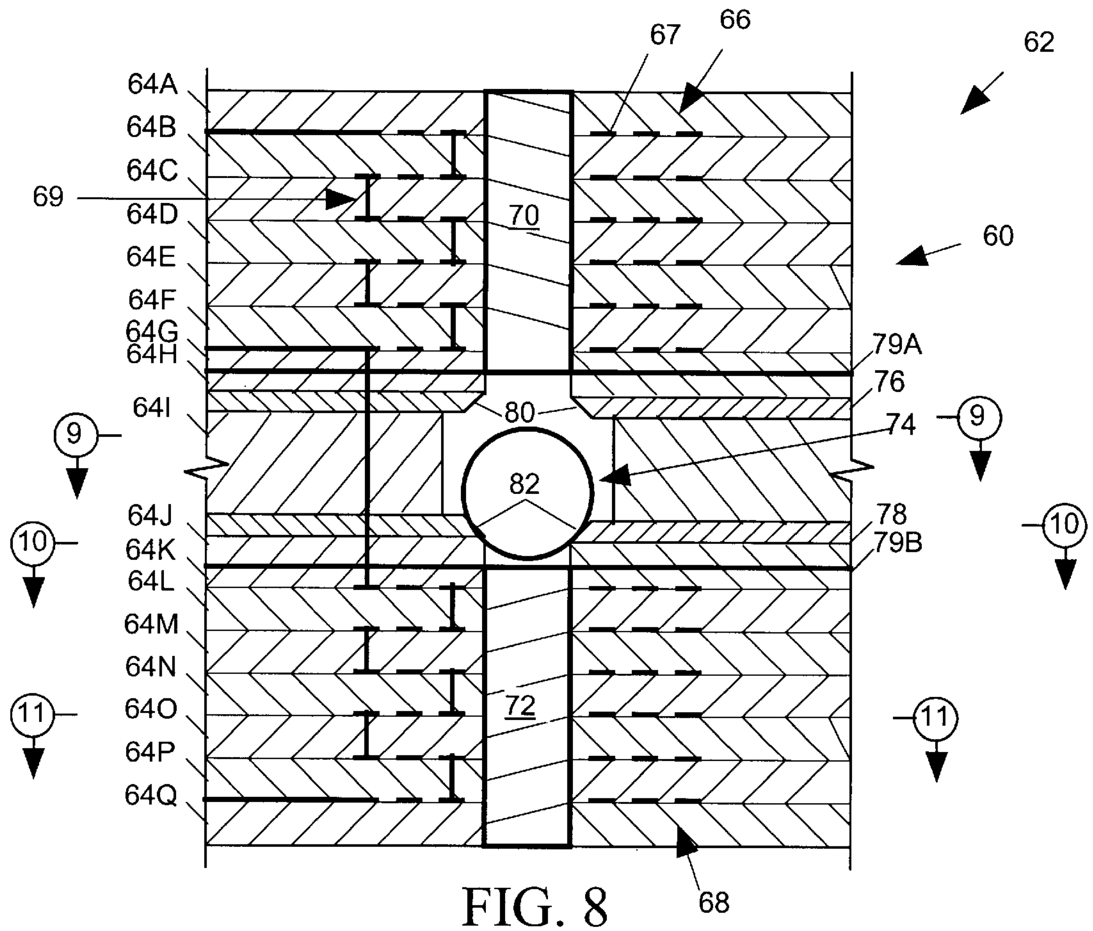
FIG. 8
FIG. 9
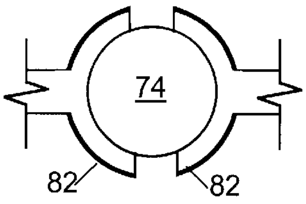
FIG. 10
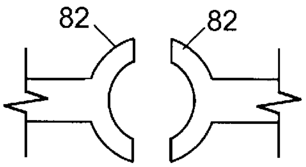
FIG. 11
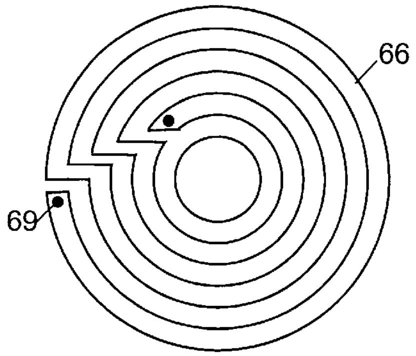
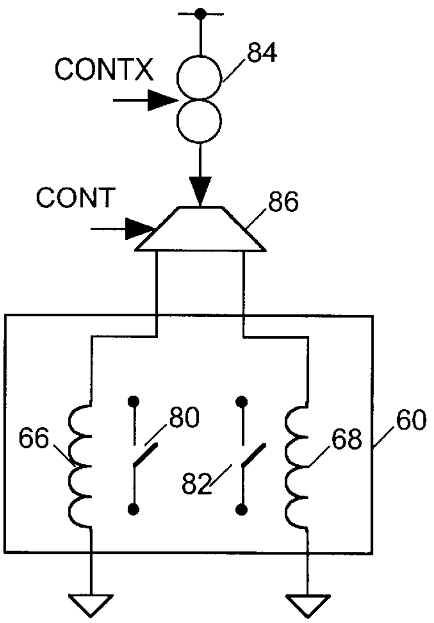
FIG. 12

FLOATING CONTACTOR RELAY

BACKGROUND OF THE INVENTION

1. Field of the Invention

The present invention relates in general to relays and in particular to a relay having a floating contactor.

2. Description of Related Art

Figure 1:
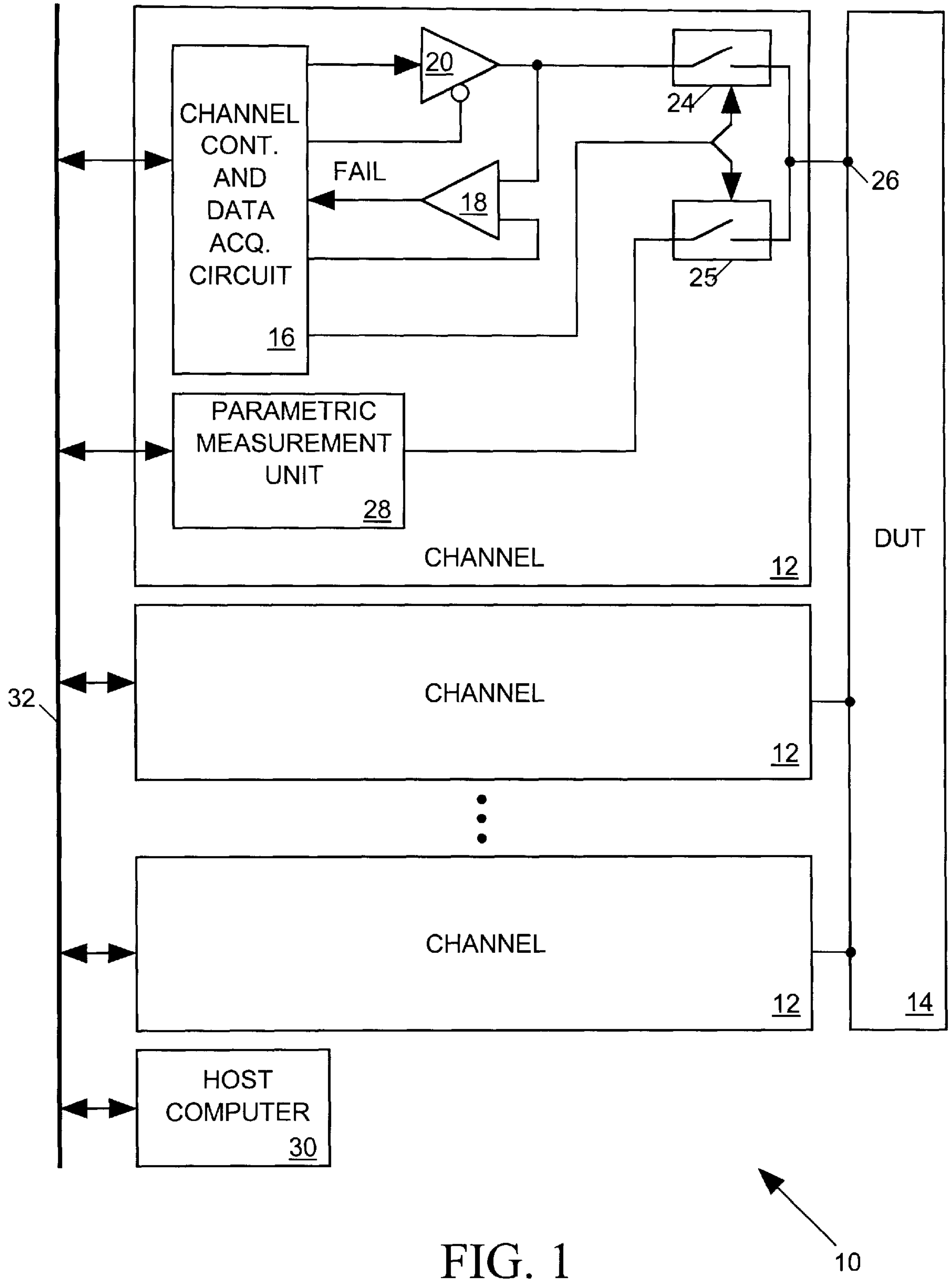
FIG. 1 (PRIOR ART)

FIG. 1 is a block diagram of a portion of a typical prior art integrated circuit (IC) tester 10 including a set of channels 12, one for each of several terminals of an IC device under test (DUT) 14. Each channel 12 includes a channel control and data acquisition circuit 16, a comparator 18 and a tristate driver 20. A relay 24 links an input of comparator 18 and an output of driver 20 to a DUT terminal 26. Another relay 25 connects a parametric measurement unit (PMU) 28 within channel 12 to DUT terminal 26. A host computer 30 communicates with the channel circuits 16 of each channel 12 via a parallel bus 32.

Tester 10 can carry out both digital logic and parametric tests on DUT 14. Before starting a digital logic test, the control and data acquisition circuit 16 of each channel 12 closes relay 24 and opens relay 25 to connect comparator 18 and driver 20 to DUT terminal 26 and to disconnect PMU 28 from terminal 26. Thereafter, during the digital logic test, the channel control signal may turn on driver 20 and signal it to send a logic test pattern to DUT terminal 26 when the DUT terminal 26 is acting as a DUT input. When terminal 26 is a DUT output, circuit 16 turns off driver 20 and supplies an "expect" bit sequence to an input of comparator 18. Comparator 18 produces an output FAIL signal indicating whether successive states of the DUT output signal matches successive bits of the expect bit sequence. Circuit 16 either stores the FAIL data acquired during the test for later access by host computer 30 or immediately notifies host computer 30 when comparator 18 asserts the FAIL signal.

PMU 28 includes circuits for measuring analog characteristics of the DUT 14 at terminal 26 such as, for example, the DUT's quiescent current. Before starting a parametric test, the channel control circuit 16 opens relay 24 and closes relay 25 to connect the channel's PMU 28 to DUT terminal 26 and to disconnect comparator 18 and driver 20 from terminal 26. Host computer 30 then programs PMU 28 to carry out the parametric test and obtains test results from the PMU.

Relays 24 and 25 are normally preferred over solid state switches for routing signals between DUT 14, PMU 28, driver 20 and comparator 18 because a relay, having very low loss, does not substantially influence test results. We would like to position comparator 18, driver 20, relays 24 and 25, and circuit 16 as close as possible to DUT terminal 26 to minimize the signal path lengths between terminal 26, comparator 18 and driver 20. When the signal paths are too long, the signal delays they cause can make it difficult or impossible to provide the signal timing needed to properly test DUT 14, particularly when the DUT operates at a high speed. Thus to minimize signal path distances we want to use relays 24 and 25 that are as short as possible and which can be reached via short signal paths.

In some prior art testers, one or more channels 12 are implemented on each of a set of printed circuit boards ("pin cards") that are mounted in a cylindrical chassis to form a test head. FIG. 2 illustrates a simplified plan view of a typical test head 34. FIG. 3 is a partial sectional elevation view of the test head 34 of FIG. 2. FIGS. 4 and 5 are expanded front and side elevation views of a lower portion of one of a set of pin cards 36 mounted within test head 34. Pin cards 36 are radially distributed about a central axis 38 of test head 34 and positioned above an integrated circuit device under test (DUT) 14 mounted on a printed circuit board, "load board" 39. A set of pogo pins 41 provide signal paths between relays 24 and 25 mounted on pin cards 36 and contact points on the surface of load board 39. Microstrip traces on load board 39 connect the contact points to terminals of DUT 14.

Relays 24, 25 are mounted near the lower edges of each pin card 36 as close as possible to central axis 38 to minimize the signal path distance to DUT 14. However from FIG. 2 we can see that the space between pin cards 36 is relatively limited near axis 38. Thus in order to position relays 24, 25 close to axis 38 we want to use relays that are relatively thin but which are fast and reliable.

FIG. 6 is a simplified sectional elevation view of a conventional reed relay 40 including a glass tube 42 containing a pair of conductive reeds 44 and 45 serving as the relay's contacts 47. A wire 46 wraps many turns around tube 42 to form a coil 48. Reeds 44, 45 are normally spaced apart, but when a voltage is applied across opposite leads 50, 52 of coil 48, magnetic flux produced by the coil flexes reeds 44, 45 causing them to contact one another so that a current may flow through the relay contacts 47. A conductive sheath 43 partially surrounds tube 42 to provide a ground surface. The spacing between reeds 44, 45 and shield 43 influences the characteristic impedance of the transmission line formed by reeds 44 and 45 when they are in contact.

The magnetic force produced by coil 48 on reeds 44,45 is proportional to the product of the magnitude of the current passing through coil 48 and the number of turns of coil about tube 42. A large number of coil turns is provided to minimize the amount of current needed to operate relay 40. However the large number of turns contributes to the thickness of relays; a relay's coil typically contributes more than half the thickness of the relay.

FIG. 7 is a schematic diagram of a typical circuit for driving coils of a set of N relays 40. One end of each relay's coil 48 is connected to a voltage source 54 while the other end of the relay's coil is connected to ground through one of a set of N switches 49 controlled by one of control signals C1–CN. For example when a control signal Cl turns on one of switches 49, the current passes through relay coil 48 thereby causing the relay's contacts 47 to close. When control signal C1 turns off switch 49, current stops passing though coil 48 and allows contacts 47 to open.

When switch 49 opens, the magnetic field produced by coil 48 collapses producing a transient voltage spike across coil 48 that is limited by a diode 56 connected across the coil. Without diode 56 the voltage spike would pass though voltage source 54 and appear as undesirable noise in other circuits receiving power from voltage source 54. Reeds 44 and 45 are also subject to contact bounce, wear, sticking and stress failure.

The opposing faces of reeds 44 and 45 have capacitance when relay 48 is open and that "stub" capacitance can influence high frequency signals. Referring to FIG. 1, for example, when the relay 24 linking unit 16 is closed and the other relay 24 is open during high frequency tests, the stub capacitance of the open relay can distort signals passing between the DUT and driver and receiver 20 and 18.

Since reeds 44 and 45 large enough to carry large currents have substantial inertia, and since reed inertia slows relay operation, relay reed size represents a trade-off between relay speed and current carrying capacity. Reeds 44 and 45, tube 42, shield 43, coils 46 and diode 56 all contribute to the size of relay 40 and the bulk of that relay makes it difficult to concentrate several such relays into a small volume. Since relay bulk can limit the number relays 24 (FIG. 1) that can be placed in a small area near a DUT terminal, only a such few relays can be used in each channel 12. The limitation of number of relays 24 in turn limits the number of test components such as devices 16 and 28 that can alternatively access What is needed is a compact, low-noise, low-stub capacitance, long-life relay for use as relays 24 and 25 of the integrated circuit tester of FIG. 1 and other applications which can switch relatively quickly for the amount of current it must carry and with little contact bounce.

BRIEF SUMMARY OF THE INVENTION

A relay in accordance with the invention includes one or more conductive coils embedded in an insulating substrate having multiple horizontally disposed layers. The relay also includes at least one set of contacts bordering a space containing a contactor in which at least a portion of its surface is conductive and shaped to mate with the contacts. The contactor is "free-floating" (i.e., unattached to any other object) and free to move within the space adjacent to the contacts. The contactor includes material such as iron or nickel so that a magnetic field can apply a motive force on the contactor. Current passing through the coil or coils produces magnetic fields which can selectively either position the contactor within the space so that its conductive surface mates with the contacts to provide a signal path therebetween, or so that its conductive surface does not mate with the contacts and does not provide a signal path therebetween.

A relay in accordance with a first embodiment of the invention includes first and second coils. When a current passes through the first coil it produces a first magnetic field pulling the contactor onto the contacts. When current alternatively passes through the second coil it produces a second magnetic field pulling the contactor away from the contacts. Thus the switching state of the relay is determined by whether current passes through the first or second coil.

A relay in accordance with a second embodiment of the invention employs a spherical contactor having first and second hemispheres of opposite magnetic polarity. The first hemisphere has a conductive surface while the second hemisphere has a non-conductive surface. When current passes through the coil in a first direction it creates a first magnetic field forcing the conductive surface of the contactor's first hemisphere onto the contacts thereby creating a signal path between the contacts. When current passes through the coil in a second direction it creates a second magnetic field forcing the non-conductive surface of the contactor's second hemisphere onto the contacts thereby breaking the signal path between the contacts.

A multiple pole relay in accordance with at third embodiment of the invention includes a spherical contactor free to roll around a torroidal channel formed in the substrate. Several contacts are distributed around an output periphery of the channel while a common contact covers an inner surface of the channel. A separate coil is embedded in the substrate proximate to each contact. Whenever a current is applied to one of the coils, it creates a magnetic field attracting the contactor so that the contactor positions itself to provide a conductive path between the contact proximate to that coil and the central contact.

When a relay in accordance with the invention employs a very small contactor which can be moved by relatively small magnetic fields, the relay's coils and cores can be relatively small. Thus many such relays can be concentrated into a relatively small volume. Since the relay's coils, cores, and contacts, and in some embodiments the contactor, are embedded in a substrate such as a printed circuit board, the relay requires little or no space on the surface of the substrate. Since it does not include any springs, reeds or other parts that substantially deform wherein making when breaking a signal path, a relay in accordance with the invention is less subject to contact bounce and material stress failures than conventional relays.

It is accordingly an object of the invention to provide a very compact, high-speed, low stub capacitance, long-lived relay that is relatively unaffected by contact bounce.

The claims portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

FIG. 1 is a block diagram of a portion of a typical prior art integrated circuit (IC) tester, FIG. 2 illustrates a simplified plan view of the test head of the tester of FIG. 1, FIG. 3 is a partial sectional elevation view of the test head FIG. 2.

Figure 13:
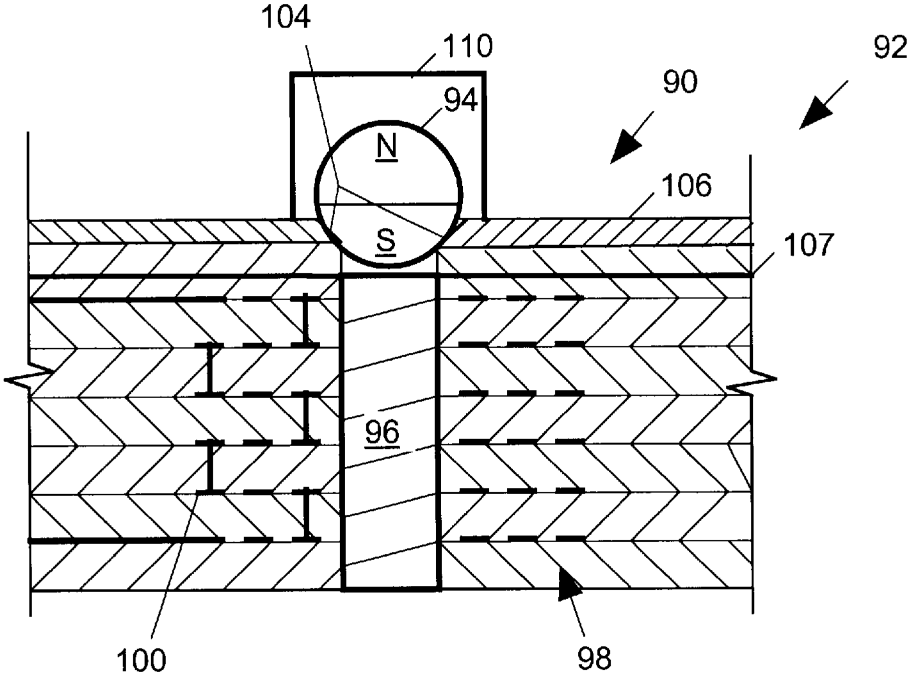
Figure 14:
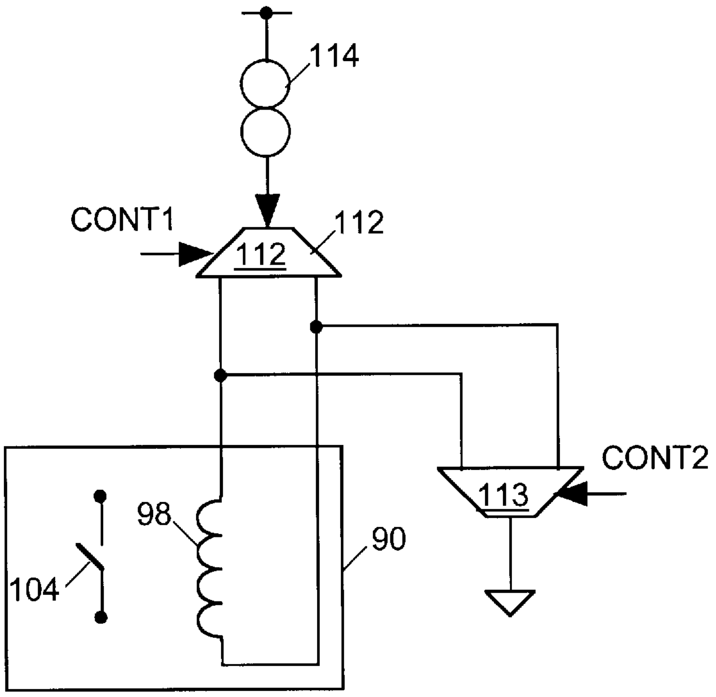
Figure 15:
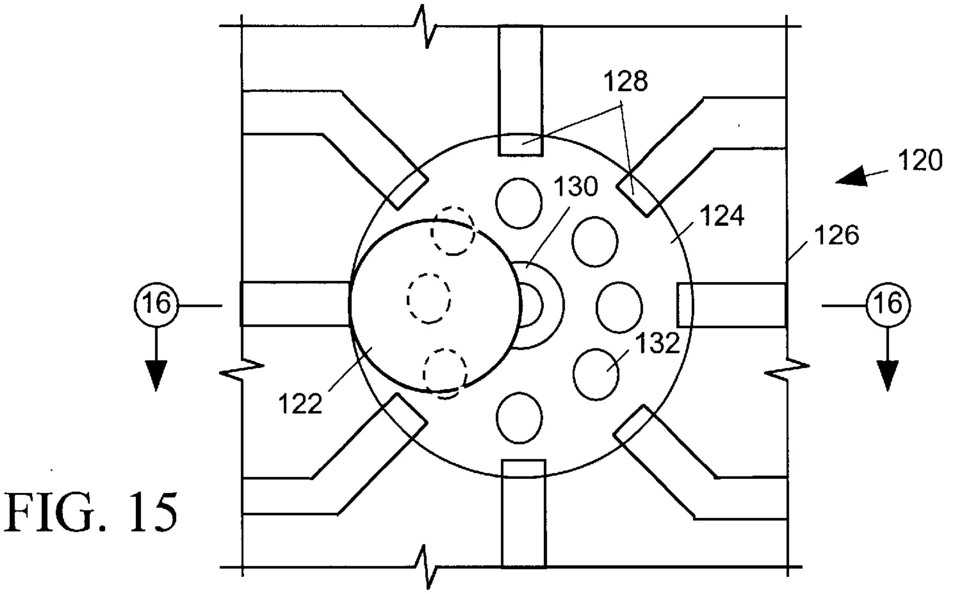

FIG. 4 is an expanded front elevation view of a lower portion of one of a set of pin cards of the test head of FIG. 2, FIG. 5 is an expanded side elevation view of a lower portion of one of a set of pin cards of the test head of FIG. 2, FIG. 6 is a simplified sectional elevation view of a prior art reed relay, FIG. 7 is a schematic diagram of a prior art circuit for driving coils of a set of reed relays, FIG. 8 is a sectional elevation view of a relay in accordance with the invention, FIGS. 9–11 are partial plan views of the relay of FIG. 8, FIG. 12 is a schematic diagram of the relay of FIG. 8 along with a current source and a switch for controlling the relay, FIG. 13 illustrates a relay in accordance with a first alternative embodiment of the invention, FIG. 14 is a schematic diagram illustrating the relay of FIG. 13 along with a switch and a current source for controlling the relay, FIG. 15 is a plan view of a relay in accordance with a second embodiment of the invention.

Figure 16:
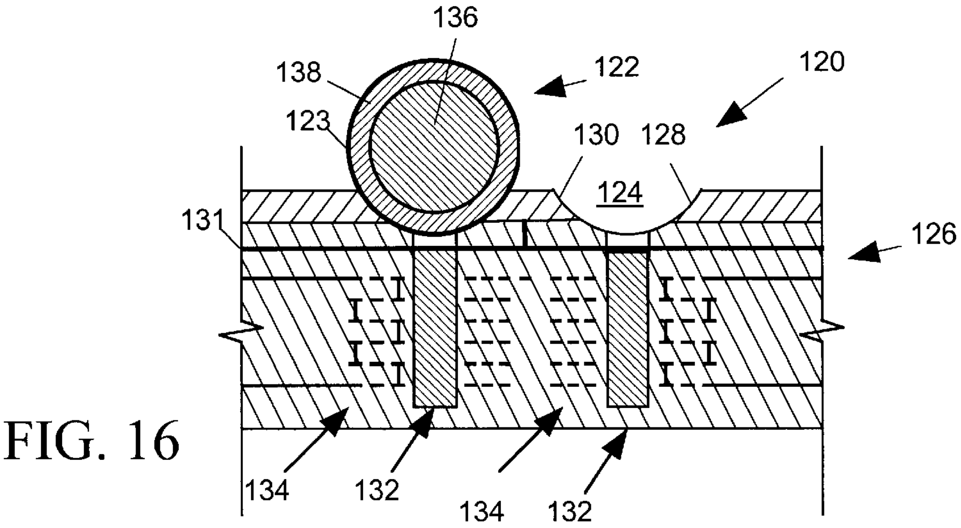
Figure 17:
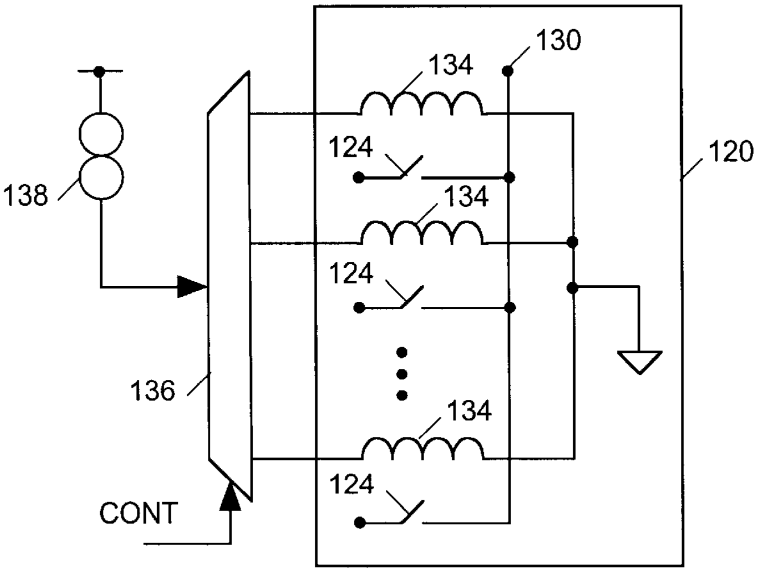
Figure 18:
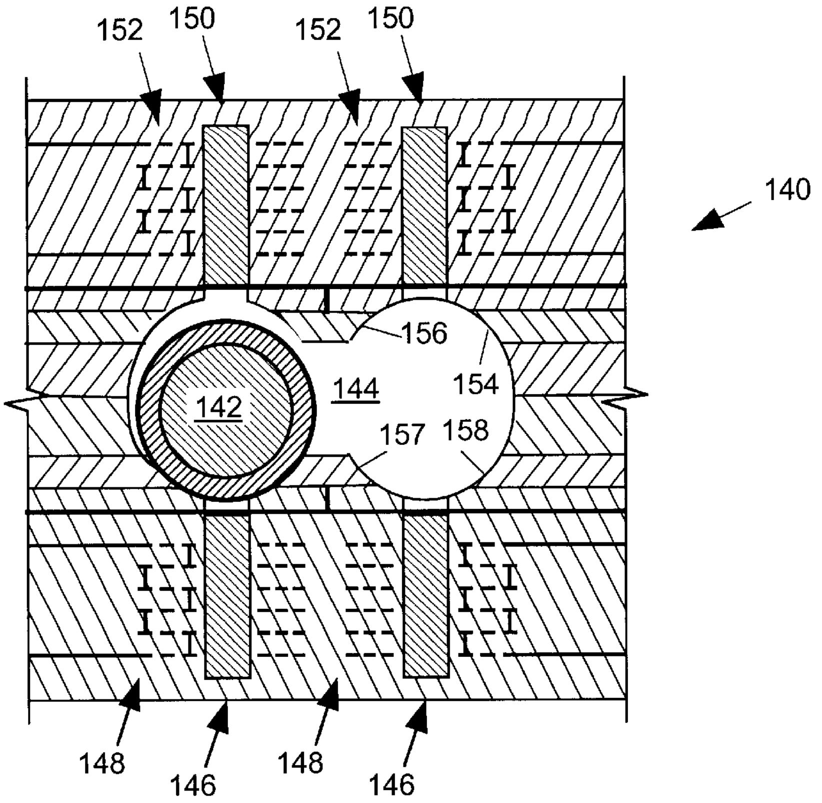
Figure 19:
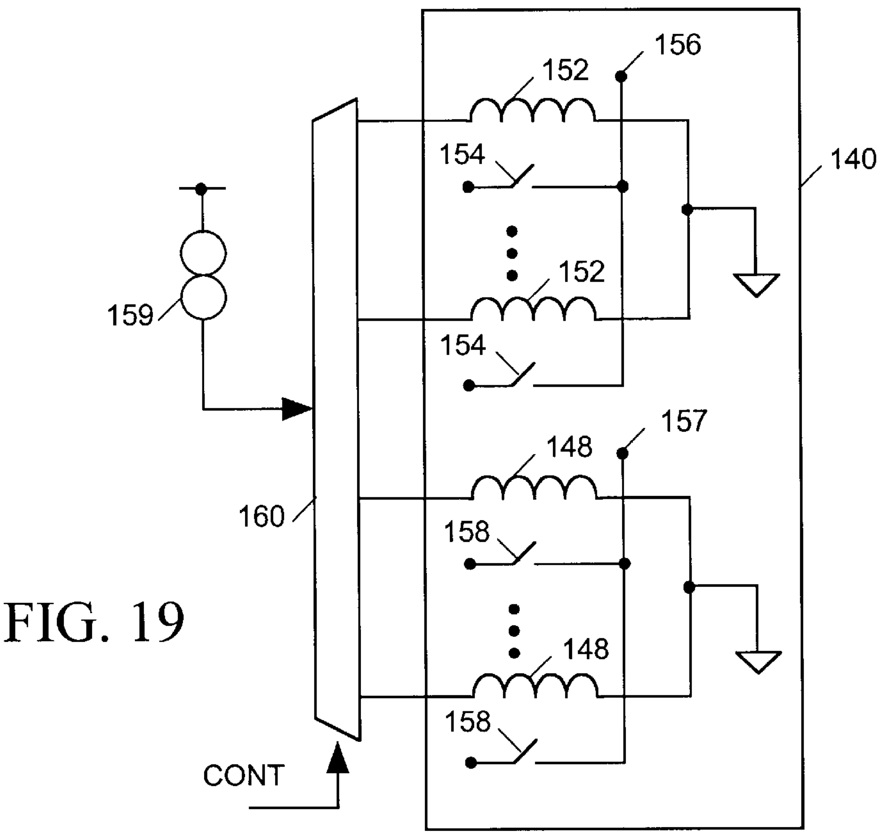
Figure 20:
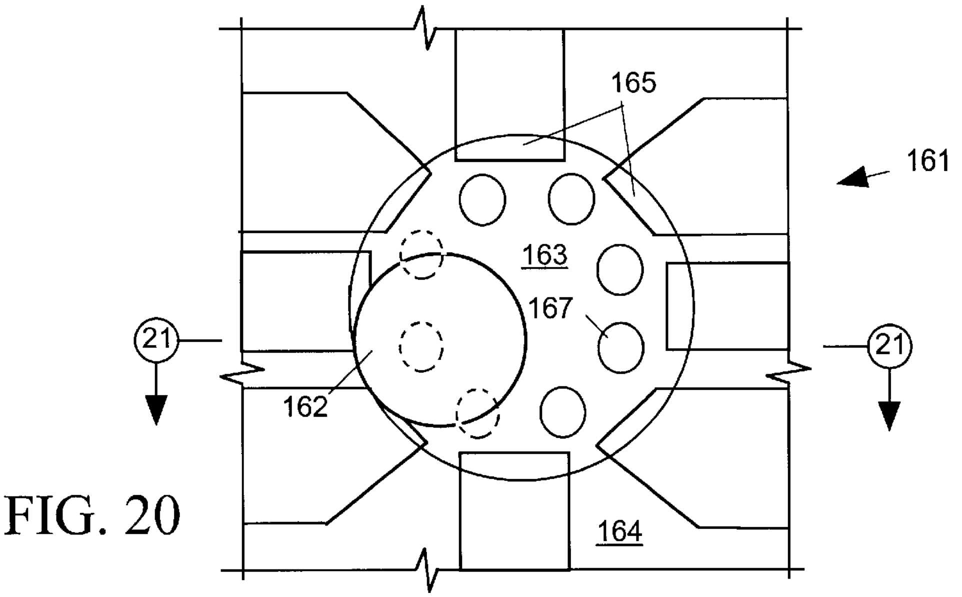
Figure 21:
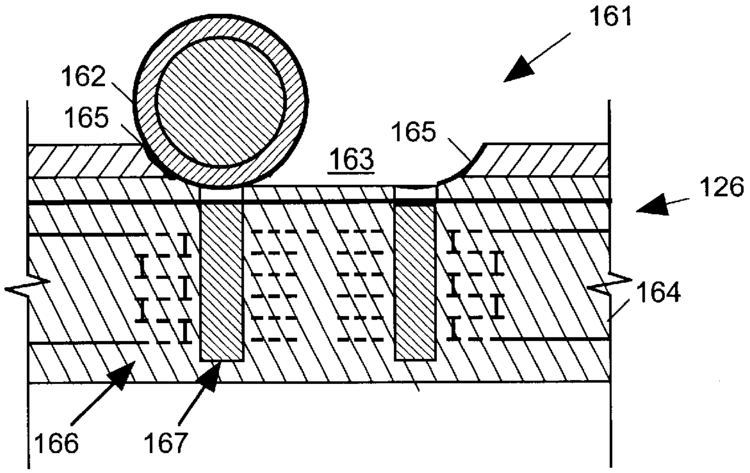
Figure 22:
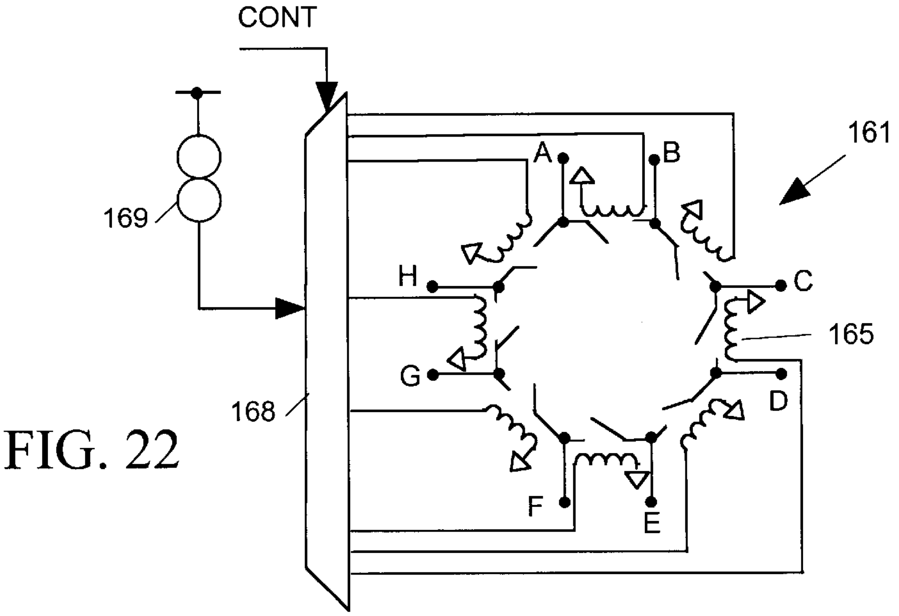
Figure 23:
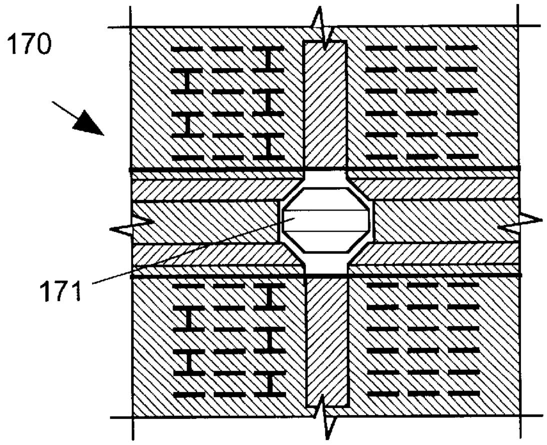
Figure 24:
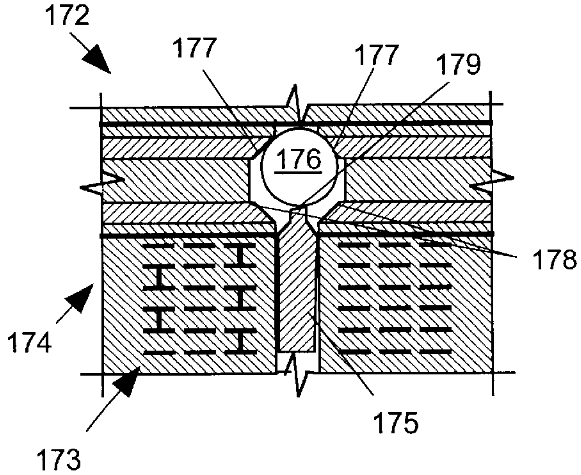
Figure 25:
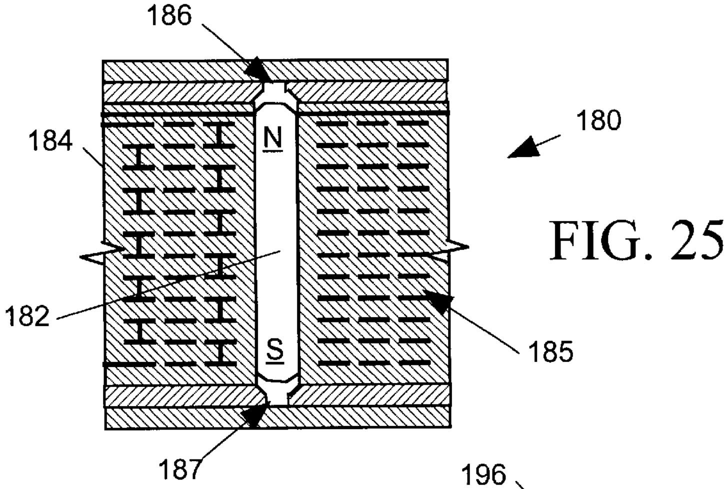
Figure 26:
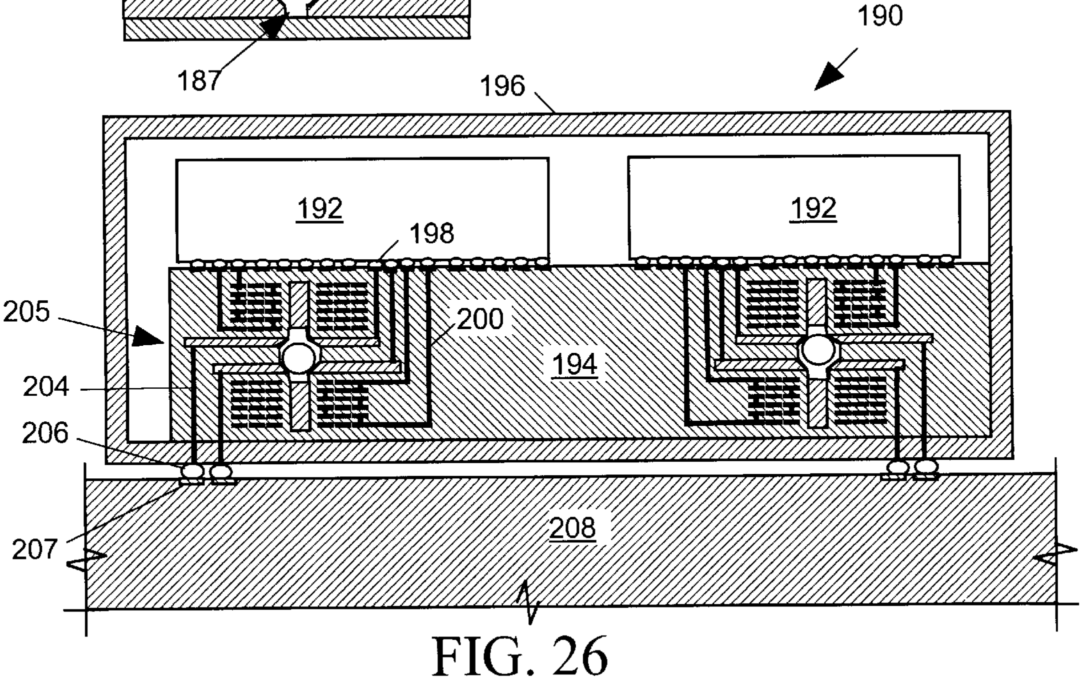

FIG. 16 is a sectional elevation view of the relay of FIG. 14,

FIG. 17 is a schematic diagram illustrating the relay of FIG. 14 along with a multiplexer and a current source for controlling the relay, FIG. 18 is a sectional elevation view of a relay in accordance with a third embodiment of the invention, FIG. 19 is a schematic diagram the relay of FIG. 18 along with a multiplexer and a current source for controlling the relay, FIG. 20 is a plan view of a relay in accordance with a fourth embodiment of the invention, FIG. 21 is a sectional elevation view of the relay of FIG. 20, FIG. 22 is a schematic diagram the relay of FIG. 20 along with a multiplexer and a current source for controlling the relay, FIG. 23 is a sectional elevation view of a relay in accordance with a fifth embodiment of the invention, FIG. 24 is a sectional elevation view of a relay in accordance with a sixth embodiment of the invention, FIG. 25 is a sectional elevation view of a relay in accordance with a seventh embodiment of the invention, FIG. 26 is a sectional elevation view of a hybrid circuit employing relays in accordance with the invention.

DETAILED DESCRIPTION OF THE INVENTION

FIG. 8 is a sectional elevation view of a relay 60 in accordance with the invention formed within the insulating substrate 62 having multiple substrate layers 64A–64Q. Substrate layers 64A–64Q may be formed of any of a wide variety of insulating substrate materials such as for example, silicon dioxide, other semiconductor oxides, silicon nitride, silicon oxynitride, ceramics, phosphor-silicate glass and other glasses, and conventional printed circuit board substrate materials. FIGS. 9, 10 and 11 are partial plan views of relay 60 along section lines 9—9, 10—10 and 11—11 of FIG. 8. Relay 60 includes a pair of multiple-turn coils 66 and 68 formed by conductive traces 67 residing on the various substrate layers 64 and interconnected by vias 69. Traces 67 may be, for example conductive metals or conductive semiconductor materials such as polysilicon. Although for simplicity each coil 66 and 68 is illustrated in FIG. 8 as having 18 turns, coils 66 and 68 can have a much larger number of turns. Each coil 66 and 68 surrounds a separate core 70 or 72, each extending vertically partially through substrate 60 and formed of iron or other suitable magnetic core material. Relay 60 also includes a small spherical contactor 74 residing between cores 70 and 72 in a cavity of layer 64H. Contactor 74 is "free-floating" in that it is not attached to any other object and is free to move anywhere within the cavity in layer 64H.

Conductive layers 76 and 78 on the upper and lower surfaces of substrate layer 64H are formed to provide one pair of conductive contacts 80 directly above contactor 74 and another pair of conductive contacts 82 directly below contactor 74. Layers 76 and 78 may, for example, be made of metal such as copper, silver or gold, or of semiconductor material. Contactor 74, suitably including iron or other material attracted by magnetic fields, has a conductive surface for providing a signal path between contacts 80 or between contacts 82. Conductive layer 79A below coil 66 and conductive layer 79B above coil 68 act as electro-static shields.

FIG. 12 is a schematic diagram illustrating relay 60 along with a current source 84 and a solid-state multiplexer 86 for controlling the relay. Multiplexer 86, in turn controlled by an externally generated control signal CONT, routes current from current source 84 either through coil 66 or through coil 68. Multiplexer 86 normally routes current through coil 68 to produce a magnetic flux in core 72 pulling contactor 74 down onto contacts 82. The conductive surface of contactor 74 provides a signal path between those contacts so that contacts 82 are normally closed. Contacts 80 are normally open because contactor 82 normally does not provide a signal path between them. However when the CONT signal tells multiplexer 86 to route the current from current source 84 through coil 66, the coil induces magnetic flux in core 70 pulling contactor 74 upward onto contacts 80 thereby closing those contacts. Contacts 82 open because contactor 82 no longer provides a signal path between them.

As may be apparent on close inspection of FIG. 8, one side of contact 80 is slightly lower than the other side of contact 80 so that when contactor 74 rises it strikes one side of the contact before it strikes the other side, thereby causing contactor 82 to rotate slightly about a first horizontal axis. Similarly one side of contacts 82 is slightly higher than the other side so that when coil 68 pulls contactor 74 downward, the contactor strikes one side of contact 80 first and then rotate slightly about a second horizontal axis perpendicular to the first axis. Thus as relay 60 repeated opens and closes contacts 80 and 82 contactor 74 rotates about two perpendicular horizontal axes. The contactor's rotating action helps to wipe contacts 80 and 82 to keep them free of contaminants and to prevent the contactor from deforming.

Another control signal CONTX controls the amount of current source 84 generates. Normally the current is only large enough to produce sufficient magnetic fields move contactor 74 up and down. However should any contaminants eventually cause contactor 74 to become stuck on either of contacts 80 or 82, the CONTX signal can signal current source 84 to temporarily provide larger currents producing stronger magnetic fields in coils 66 and 68. By alternately switching the large current between coils 66 and 68, vibrations produced on contactor 82 can free it. The ability to free a stuck contactor helps to prolong the life of the relay.

Unlike prior art reed relays, relay 60 does not rely on parts that flex and therefore and is therefore less subject to stress failures. When contactor 74 is very small, relay 60 can be very small, and since relay 60 is wholly embedded in substrate 62, it takes up no space above the substrate. Note that since contacts 82 are spaced apart and have relatively little opposed surface area, they have very little stub capacitance in the open state. The low contact capacitance makes relay 62 particularly suitable for high frequency applications.

FIG. 13 illustrates a relay 90 embedded in a substrate 92 in accordance with an alternative embodiment of the invention. Relay 90 includes a spherical contactor 94, a single core 96 embedded in substrate 92 below contactor 94, a single coil 98 formed by traces 100 surrounding core 96, and a pair of contacts 104 formed in a conductive layer 106 on the upper surface of substrate 92. A cover 110 mounted on substrate 92 covers contactor 94. The contactor 94 suitably has a core magnetized iron, nickel or other magnetic material so that contactor 94 has a north and south pole. The surface of the contactor's southern hemisphere is coated with conductive material such as, for example gold or silver, while the surface of the contactor's northern hemisphere is coated with an insulator such as glass or ceramic material. A conductive layer 107 above coil 98 acts as an electrostatic shield.

FIG. 14 is a schematic diagram illustrating relay 90 along with a pair of multiplexers 112 and 113 and a current source for controlling the relay. Multiplexers 112 and 113, controlled by externally generated control signals CONT1 and CONT2 may route current from current source 114 in either direction through coil 98. When the current passes through coil 98 in one direction, the upper end of core 96 becomes a northern magnetic pole and pulls the southern pole of contactor 94 onto contacts 104. Since the surface of the contactor's southern hemisphere is conductive it provides a signal path between contacts 104. When switch 112 thereafter routes current from current source 114 in the opposite direction through coil 98, the upper end of core 96 becomes a southern magnetic pole repelling the contactor's southern pole and attracting the contactor's northern pole. Contactor 94 thus rotates so that its northern pole now points downward. Since the surface of the contactor's northern hemisphere is non-conductive, the signal path between contacts 104 is broken.

FIG. 15 is a plan view and FIG. 16 is a sectional elevation view of an eight-pole, single-throw relay 120 in accordance with the invention. A spherical contactor 122 having a conductive surface 123 rolls in a torroidal channel 124 formed in the upper surface of a circuit board 126. A set of eight contacts 128 formed in a conductive layer on the surface of substrate 126 are distributed about the circular periphery of channel 124. A single common contact 130 covers the inner circumference of channel 124. A set of eight iron cores 132 are embedded in substrate 26 under channel 124, each surrounded by a separate coil 134 formed by traces and vias embedded within substrate 126. Contactor 122 suitably includes a ceramic core 136 coated by iron or nickel 138 and a conductive gold outer layer 123. A cover (not shown) residing on the surface of circuit board 126 suitably encloses contactor 122 and channel 124.

FIG. 17 is a schematic diagram illustrating relay 120 and a multiplexer 137 and current source 139 for controlling the relay. Multiplexer 137 responds to externally generated control data (CONT) by directing the current output of current source 139 to one of coils 134. The coil 134 receiving the current magnetizes the core 132 it surrounds. The magnetic field from that core attracts contactor 122 so that it rolls around channel 124 and positions itself over that particular coil. The conductive surface 123 of contactor 122 provides a signal path between the adjacent contact 124 and central contact 130. and as a signal path to central contact 130. On system startup, the CONT signal suitably cycles the current from current source 138 to each of coils 134 in turn so as to place contactor 122 in a known position.

FIG. 18 is a sectional elevation view of a sixteen-pole, double-throw relay 140 including a contactor 142 similar to contactor 122 of FIG. 16 residing in a torroidal channel 144 embedded wholly within a substrate 145. Relay 140 is similar to relay 120 of FIGS. 15 and 16 except that in addition to eight cores 146 and coils 148 below channel 144, it has another eight cores 150 and coils 152 above the channel. It also has a separate set of eight upper contacts 154 distributed about the circular periphery of the channel and an upper common contact 156 in addition to eight lower contacts 158 and lower common contact 157.

FIG. 19 is a schematic diagram illustrating relay 140 and a multiplexer 160 and current source 159 for controlling the relay. Multiplexer 160 responds to externally generated control data (CONT) by directing the current output of current source 159 to one of coils 148 or 152. When one of lower coils 148 receives the current, it magnetizes the core 146 it surrounds. The magnetic field from that core attracts contactor 142 so that it positions itself over that particular coil with the conductive surface of contactor 142 providing a signal path between the adjacent lower contact 158 and lower common contact 157. When one of upper lower coils 152 receives the current from current source 159, it magnetizes its corresponding core 150 and current magnetic field from that core attracts contactor 142 so that it positions itself to provide a signal path between the adjacent upper contact 154 and upper common contact 156.

FIG. 20 is a plan view and FIG. 21 is a sectional elevation view of a relay 161 in accordance with the invention having eight terminals A–H. FIG. 22 is a schematic diagram of relay 161 along with a multiplexer 168 and current source 169 for controlling it. A spherical contactor 162 resides in a circular, dish-shaped channel 163 on the upper surface of a substrate 164. A set of eight contacts 165 formed in a conductive layer on the surface of substrate 164 are distributed about the circular periphery of channel 163. A set of relay coils 166 and cores 167 embedded within substrate 164 under channel 163 are positioned so that when any one coil 166 receives current from source 169, its related core 167 produces a magnetic field pulling contactor 162 over two adjacent contacts 165. Contractor 162 then completes a signal path between the two adjacent contacts. Thus relay 161 can interconnect any pair of adjacent relay terminals A–H.

A version of relay 61 having three terminals A, B and C instead of eight may replace prior art relays 24 and 25 of FIG. 1. In addition to providing alternative signal paths from DUT terminal 26 to receiver/drier 18,20 or to parametric measurement unit 28, such a relay could also provide a signal path between driver, receiver 18,20 and parametric measurement unit 28 while isolating DUT terminal 26. This would, for example, permit the use of parametric measurement unit 28 for calibrating driver 20 and receiver 18 without being affected by the input impedance of DUT terminal 26.

FIG. 23 illustrates a relay 170 generally similar to relay 60 of FIG. 8 except that it has a bullet-shaped contact element 171 instead of a spherical contact element 82. It should be apparent that other contactor shapes, such as for example polyhedrons, could be employed in various versions of the relay described above when suitable adjustments are made to the shape of the relay contacts the contactor contacts.

FIG. 24 illustrates a relay 172 wherein a magnetic field created by current passing though a coil 173 embedded in a substrate 174 moves a magnetized core 175 upward to push a conductive spherical contactor 176 onto contacts 177 formed in a conductive layer above the contactor. When the direction of current through coil 173 is reversed, core 175 moves downward permitting contactor 176 to fall onto contacts 178 formed on a conductive layer below the contactor. An upper tip 179 of core 175 is slanted so that contactor 176 rotates slightly each time core 175 pushes the contactor upward.

FIG. 25 illustrates a relay 180 in accordance with the invention in which an elongate conductive contactor 182, a permanent magnet having north and south magnetic poles, resides in a space 183 within a substrate 184 surrounded by an embedded coil 185. When current passes through coil 185 in a first direction, coil 185 generates a magnetic field driving contactor 182 upward and to that it makes contact with a pair of upper conductive contacts 186. When a current passes though coil 185 in a second direction, coil 185 generates a magnetic field driving contactor 182 downward onto a pair of lower conductive contacts 187.

Embedded relays in accordance with the invention may be used, for example, to provide relay contacts at the input/output terminals of a hybrid circuit. FIG. 26 illustrates a hybrid circuit 190 including two "flip-chip" integrated circuit chips 192 mounted on a substrate 194 residing within an integrated circuit package 196. Solder balls 198 link input/output pads on the surfaces of chips 192 to vias 200 extending downward to contact and coil terminals of relays 205 embedded in substrate 194. Additional vias 204 extend downward from contacts of embedded relays 205 to solder balls 206 connecting hybrid circuit 190 to traces 207 on the surface of a larger substrate 208.

While the embodiments of the relay are described herein above as being implemented within conventional multiple-layer printed circuit boards, other embodiments of the relay could be implemented on other types of multiple layer substrates including, for example, substrates formed of ceramic and semiconductor materials.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A relay comprising:

two first conductive contacts;

a contactor having a surface including a conductive area and residing unattached within a space partially bounded by the first conductive contacts, the contactor comprising material subject to a motive force when in a magnetic field;

a first coil for intermittently conducting a first current and for generating a first magnetic field when conducting the first current, wherein the first magnetic field causes the contactor to move within the space until the conductive area of the contactor's surface comes into contact with the first conductive contacts thereby providing a first signal path between the first conductive contacts; and a substrate of insulating material, the substrate having an outer surface, the first conductive contacts being formed on the substrate's outer surface, the contactor residing external to the substrate.

2. The relay in accordance with claim 1 wherein the substrate of insulating material substantially surrounds the space in which the contactor resides.

3. The relay in accordance with claim 1 comprising a substrate of insulating material having a first surface;

two first conductive contacts formed on the first surface of the substrate of insulating material;

a contactor having a second surface including a conductive area, the contactor comprising material subject to a motive force when in a magnetic field; and a first coil for intermittently conducting a first current and for generating a first magnetic field when conducting the first current, wherein the first magnetic field applying the motive force to the contactor, causing the contactor's conductive area to come into contact with the first conductive contacts thereby providing a first signal path between the first conductive contacts;

wherein the first coil is embedded in the substrate of insulating material.

4. The relay in accordance with claim 3 wherein the space in which the contactor resides forms a torroidal channel in the substrate, wherein substantially all of the surface of the contactor is conductive, and wherein the first contacts partially bound the torroidal channel.

5. The relay in accordance with claim 1 wherein the substrate of insulating material has a plurality of layers, and wherein the first coil comprises a plurality of conductive traces residing between the layers.

6. The relay in accordance with claim 5 wherein the first coil further comprises conductive vias passing through ones of the layers and interconnecting the traces.

7. The relay in accordance with claim 5 further comprising a core of magnetic material positioned within the substrate such that the first magnetic field produces magnetic flux in the core.

8. The relay in accordance with claim 5 wherein at least one layer comprises an oxide of silicon.

9. The relay in accordance with claim 5 wherein at least one layer comprises ceramic.

10. The relay in accordance with claim 5 wherein at least one layer comprises glass.

11. The relay in accordance with claim 5 wherein at least one layer comprises silicon nitride.

12. The relay in accordance with claim 5 wherein at least one layer comprises silicon oxynitride.

13. A relay comprising:

two first conductive contacts;

a contactor having a conductive area with a curved surface and residing unattached within a space partially bounded by the first conductive contacts, the contactor comprising material subject to a motive force when in a magnetic field; and a first coil for intermittently conducting a first current and for generating a first magnetic field when conducting the first current, wherein the first magnetic field causes the contactor to move within the space until the curved surface of the conductive area comes into contact with the first conductive contacts thereby providing a first signal path between the first conductive contact.

14. The relay in accordance with claim 13 wherein the contactor is substantially spherical.

15. The relay in accordance with claim 1 wherein substantially all of the surface of the contactor is conductive.

16. A relay comprising:

two first conductive contacts;

a contactor having a surface including a conductive area and residing unattached within a space partially bounded by the first conductive contacts, the contactor comprising material subject to a motive force when in a magnetic field;

a first coil for intermittently conducting a first current and for generating a first magnetic field when conducting the first current, wherein the first magnetic field causes the contactor to move within the space until the conductive area of the contactor's surface comes into contact with the first conductive contacts thereby providing a first signal path between the first conductive contacts; and a second coil for intermittently conducting a second current and for generating a second magnetic field when conducting the second current, wherein the second magnetic field causes the contactor to move within the space away from the first conductive contacts.

17. The relay in accordance with claim 16 further comprising second conductive contacts partially bounding the space in which the contactor resides, wherein the second magnetic field causes the contactor to move within the space toward second conductive contacts until the conductive area of the contactor's surface comes into contact with the second conductive contacts thereby providing a second signal path between the second conductive contacts.

18. The relay in accordance with claim 1 wherein the contactor has magnetic first and second poles of opposite polarity, wherein the magnetic first pole lies within the conductive area of the contactor's surface, wherein another area of the contactor's surface is non-conductive, and wherein the magnetic second pole lies within said another area.

19. The relay in accordance with claim 18 further comprising means for selectively causing the coil to conduct the first current alternatively in first and second directions, wherein when the coil conducts the first current in the first direction, the coil produces the first magnetic field causing the contactor to move within the space until the conductive area of the contactor's surface comes into contact with the first conductive contacts thereby providing the first signal path between the first conductive contacts, and wherein when the coil conducts the current in the second direction, the coil places the contactor in a second magnetic field causing the contactor to move within the space until the non-conductive other area of the contactor's surface comes into contact with the first conductive contacts.

20. The relay in accordance with claim 19 further comprising a substrate having a plurality of layers comprising insulating material, wherein the first coil comprises a plurality of conductive traces residing between the layers.

21. The relay in accordance with claim 20 wherein the first coil further comprises conductive vias passing through ones of the insulating layers and interconnecting the traces.

22. The relay in accordance with claim 21 further comprising a core of magnetic material positioned within the substrate such that the first magnetic field produces magnetic flux in the core.

23. A relay comprising:

two first conductive contacts;

a contactor having a surface including a conductive area and residing unattached within a space partially bounded by the first conductive contacts, the contactor comprising material subject to a motive force when in a magnetic field;

a first coil for intermittently conducting a first current and for generating a first magnetic field when conducting the first current, wherein the first magnetic field causes the contactor to move within the space until the conductive area of the contactor's surface comes into contact with the first conductive contacts thereby providing a first signal path between the first conductive contacts; and a substrate of insulating material, the substrate having a channel therein at least partially bounding the space in which the contactor resides, the first contacts residing in the channel, the first being embedded in the substrate;

two second contacts residing in the channel; and a second coil for placing the contactor in a second magnetic field when the second coil is conducting a current in a second direction, wherein the second magnetic field causes the contactor to move within the space until the conductive area of the contactor's surface comes into contact with the second conductive contacts thereby providing a second signal path between the second conductive contacts.

24. The relay in accordance with claim 23 wherein the first and second coils are embedded in the substrate.

25. The relay in accordance with claim 23 further comprising:

two third contacts residing in the channel;

a third coil for placing the contactor in a third magnetic field when the third coil is conducting a current in a third direction, wherein the third magnetic field causes the contactor to move within the space until the conductive area of the contactor's surface comes into contact with the third conductive contacts thereby providing a third signal path between the third conductive contacts.

26. The relay in accordance with claim 25 wherein the first, second and third coils are embedded in the substrate.

27. The relay in accordance with claim 25 wherein the channel has a circular periphery.

28. The relay in accordance with claim 1 wherein the contactor is spherical and the relay further comprises:

a substrate of insulating material having a channel therein at least partially bounding the space in which the contactor resides, the channel having an inner circumference and an outer circumference, one of said first contacts residing proximate to the inner circumference and another of the first contacts residing proximate to the outer circumference, a plurality of second contacts residing proximate to the outer circumference a plurality of second coils, each corresponding to a separate one of the second contacts, each second coil for placing the contactor in a second magnetic field when the second coil is conducting a current in a second direction, wherein the second magnetic field causes the contactor to move within the channel until the conductive area of the contactor's surface comes into contact with said one of said first contacts and the second coil's corresponding second contact, thereby providing a second signal path between said one of said first contacts and the corresponding second contact.

29. The relay in accordance with claim 28 wherein the first and second coils are embedded in the substrate.

30. The relay in accordance with claim 29 wherein the substrate includes a plurality of layers comprising insulating material, wherein each of the first and second coils comprises a plurality of conductive traces residing between the layers.

31. The relay in accordance with claim 30 wherein each of the first and second coils further comprises conductive vias passing through ones of the insulating layers and interconnecting the traces.

32. The relay in accordance with claim 31 further comprising a plurality of cores of magnetic material, each corresponding to a separate one of said first and second coils, each core being embedded within the substrate and positioned such that when its corresponding one of said first and second coils produces a magnetic field, that magnetic field produces magnetic flux in the core.

33. A relay comprising:

a substrate formed of electrically insulating material;

conductive contacts formed on the substrate;

a contactor having a surface including a conductive area and residing unattached within a space partially bounded by the conductive contacts;

a first coil embedded in the substrate for intermittently conducting a first current in a first direction and for generating a first magnetic field when conducting the first current, and a magnetized core positioned such that the first magnetic field moves the core toward the conductive contacts, causing the core to force the contactor onto the conductive contacts such that the contactor's conductive area provides a signal path between the first conductive contacts.

34. The relay in accordance with claim 33 wherein the first coil also intermittently conducts a second current in a second direction and generates a second magnetic field when conducting the second current, wherein the second magnetic field moves the core away from the conductive contacts.

35. A hybrid circuit comprising:

a printed circuit board;

an integrated circuit chip mounted on the printed circuit board and having a signal terminal;

two first conductive contacts mounted on the printed circuit board, means for conductively linking one of the two first conductive contacts to the signal terminal of the integrated circuit chip;

a contactor having a surface including a conductive area and residing unattached within a space partially bounded by the first conductive contacts, the contactor comprising material subject to a motive force when in a magnetic field; and a first coil embedded in the printed circuit board for intermittently conducting a first current and for generating a first magnetic field when conducting the first current, wherein the first magnetic field causes the contactor to move within the space until the conductive area of the contactor's surface comes into contact with the first conductive contacts thereby providing a first signal path between the first conductive contacts.

36. The hybrid circuit in accordance with claim 35 wherein the printed circuit board comprises a plurality of layers comprising insulating material, wherein the first coil comprises a plurality of conductive traces residing between the layers.

37. The relay in accordance with claim 36 wherein the first coil further comprises conductive vias passing through ones of the insulating layers and interconnecting the traces.

38. A relay comprising:

an insulating substrate having an interior cavity, a conductive contactor residing within the cavity;

two first contacts residing on the insulating substrate and exposed within the cavity;

a first coil formed within the insulating substrate proximate to the two first contacts, wherein when the first coil conducts a first current, the first coil produces a first magnetic flux pulling the contactor into engagement with the two first contacts.

39. The relay in accordance with claim 38 wherein the contractor is spherical.

40. The relay in accordance with claim 38 further comprising:

a first core of magnetic material embedded in the insulating substrate and substantially surrounded by the first coil.

41. The relay in accordance with claim 38 further comprising:

two second contacts residing on the insulating substrate and exposed within the cavity; and a second coil formed within the insulating substrate proximate to the two second contacts, wherein when the second coil conducts a second current, the second coil produces a second magnetic flux pulling the contactor into engagement with the two second contacts.

42. The relay in accordance with claim 41 wherein the contractor is spherical.

43. The relay in accordance with claim 42 further comprising:

a first core of magnetic material embedded in the insulating substrate and substantially surround by the first coil; and a second core of magnetic material embedded in the insulating substrate and substantially surrounded by the second coil.

44. The relay in accordance with claim 39 wherein the contractor has a central axis, and wherein when the contactor engages the first contacts, it engages one of the first contacts before it engages another of the first contacts, such that the contactor rotates about its central axis after it said one of the first contacts and before it engages said another of the first contacts.

* * * * *